United States Patent [19]

Barsuhn et al.

[11] 4,204,634

[45] May 27, 1980

[54] STORING PARTIAL WORDS IN MEMORY

[75] Inventors: Horst E. Barsuhn, Holzgerlingen; Ulrich Olderdissen, Herrenberg; Werner Schmidt, Holzgerlingen, all of Fed. Rep. of Germany

[73] Assignee: International Business Machines Corporation, Armonk, N.Y.

[21] Appl. No.: 939,314

[22] Filed: Sep. 5, 1978

[30] Foreign Application Priority Data

Mar. 16, 1978 [DE] Fed. Rep. of Germany ....... 2811318

[51] Int. Cl.$^2$ ............................................ G06F 11/12
[52] U.S. Cl. ...................................... 371/38; 364/900
[58] Field of Search ............. 235/312; 340/146.1 AL; 364/200, 900

[56] References Cited

U.S. PATENT DOCUMENTS

| | | | |
|---|---|---|---|
| 3,351,915 | 11/1967 | Fought et al. ....................... | 364/900 |
| 3,573,728 | 4/1971 | Kolankowsky ............ | 340/146.1 AL |
| 3,883,854 | 5/1975 | Heinberg et al. ..................... | 364/900 |
| 4,005,405 | 1/1977 | West .................................. | 235/312 |
| 4,100,403 | 7/1978 | Eggenberger et al. .............. | 235/312 |
| 4,112,502 | 9/1978 | Scheuneman ........................ | 364/900 |
| 4,139,149 | 2/1979 | Scheuneman ........................ | 235/312 |
| 4,157,586 | 6/1979 | Gannon et al. ...................... | 364/200 |

Primary Examiner—Charles E. Atkinson
Attorney, Agent, or Firm—James E. Murray

[57] ABSTRACT

This specification describes transferring a partial block of data with first and last words that are partial words from a processor and storing it in a memory protected by an error correcting code that requires the words to be stored in the memory as whole words. Prior to the initiation of the transferring and storage procedure, the memory is accessed and data words corresponding to the partial words in the partial block of data are fetched and placed in registers. Thereafter, during the transferring of the partial words, the fetched words are combined with the partial words to generate full words. Error correction check bits are added to these generated full words and the combination is stored into the memory.

4 Claims, 7 Drawing Figures

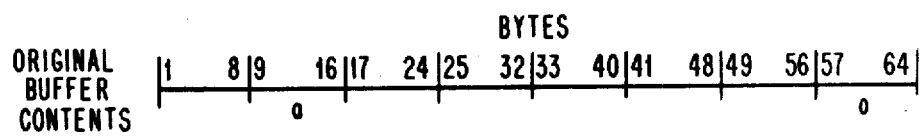
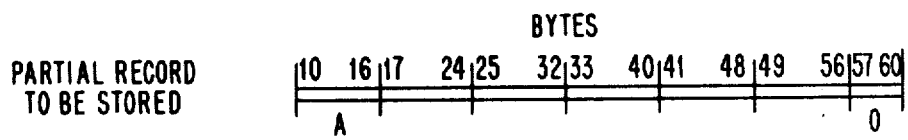
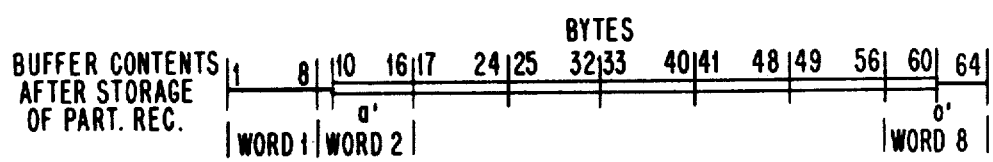
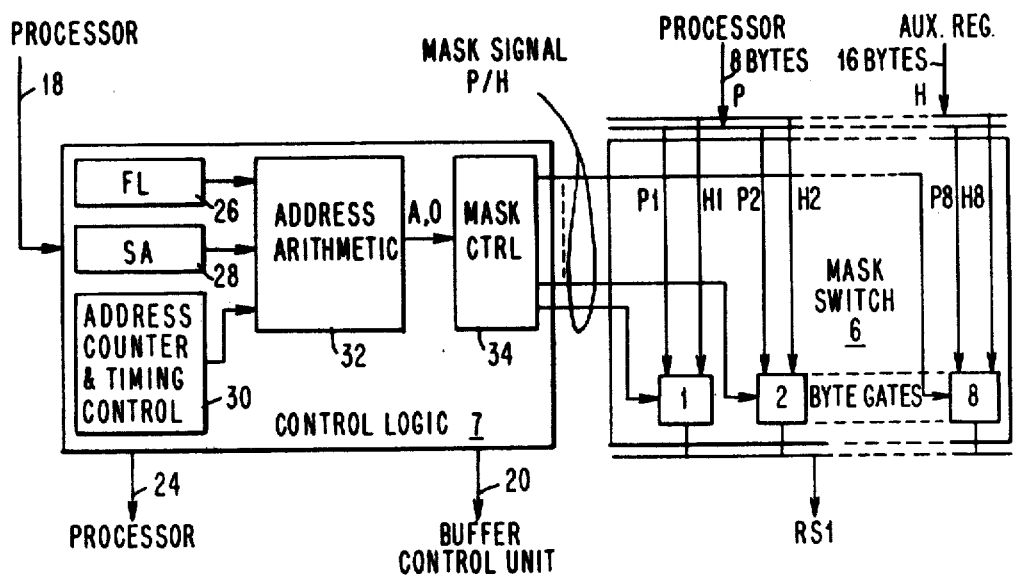

STORING PARTIAL WORDS IN MEMORY

BACKGROUND OF THE INVENTION

The invention relates to the generation of error correction check bits when storing partial data words.

In U.S. Pat. No. 3,573,728 words which are eight bytes each made up of eight data bits and one parity bit are supplemented by error detection and correction check bits and stored together in memory. Only full words, that is, those words which contain eight data bytes can be used for calculating the check bits and stored. However, when a partial data block is stored in memory the first or the last word or both of the data block to be stored could be a partial word. That is, a word which does not have a full complement of eight bytes. To overcome this dilemma, any partial word in the data block is pre-stored in the input data register of the storage. Subsequently, a data word containing the bytes required to supplement the partial word is read from storage, and combined with the partial word to generate a full word. In producing this generated full word, the word read out of storage must be checked for errors using the error detection and correction code. The reading out and checking of the word from storage in this manner has disadvantages, not the least of them being it causes considerable delays in the transfer of partial data blocks from the processor of the data processing system into storage particularly if the procedure has to be performed twice.

German patent AS 2 133 323 deals with the partial word storage problem in a half-word organized storage whose half-words comprise two bytes, one byte of which has to be changed. German patent AS 2 133 323 suggests that the two bytes be read into two separate registers and check bits calculated separately for each byte. Due to the division into individual bytes, the device described in the German patent avoids the difficulties connected with the combination of partial words supplied by the processor with full words read out of the storage. However the device described in the mentioned German patent has a very high number of check bits to be calculated for each data byte. For eight bytes it would require the calculations and processing of 32 to 40 check bits. It is obvious that in view of its high demand on storage space and check bit processing this solution is out of the question for most data processing systems.

THE INVENTION

In accordance with the present invention, the corresponding word to any partial word to be stored is fetched from storage prior to the starting of the storage sequence for any of the partial or full words making up the block of data being stored. The advantage of this is that it permits the transfer of the partial data block without any time delay, because the data words from the buffer storage to be combined with the partial words are available at the right moment of the data transfer. The combination is executed during the transfer of the data block, practically "on the fly". The prefetch operations for the partial words can be made to overlap. As a result, the transfer of the partial data block does not take significantly longer than the transfer of a full block, in spite of the necessary combination with data words which must be fetched from storage.

Furthermore, the mask switch used to make the combination can be of a simple structure. It masks certain bytes of the data word supplied by the auxiliary register and combines the memory with the partial word bytes. In the combining process it is controlled by control logic which has to receive only start address and the field length data of the partial data block from the processor of the system. From this information, control logic itself determines that the respective transfer is a partial data block transfer, or such a functional signal is already supplied by the processor.

THE DRAWINGS

An embodiment of the invention will now be explained by means of the figures of which:

FIG. 1 is a block diagram of important units of a data processing system where the device as disclosed by the invention is used, FIGS. 2a through 2c are a representation of a data block, FIG. 3 is a block diagram of an embodiment of the invention for the transferring from the processor and the storing in the buffer of the data block of FIG. 2, FIG. 4 is a block diagram of details of the mask switch shown in FIG. 3, and of the control logic, and FIG. 5 is a time chart of the prefetch operation and of the transfer of the partial data block from the processor to the buffer.

DETAILED DESCRIPTION

Figure 1:
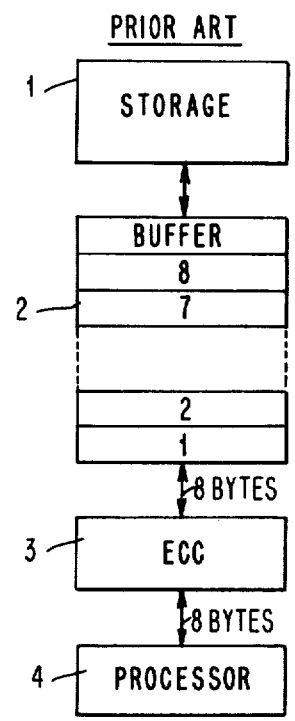

FIG. 1 shows the units of a data processing system which are of most importance to the embodiment description given below. An interconnecting buffer 2 is provided for a slow storage 1 of high capacity. The buffer 2 is preferably arranged on the same chip as storage 1. The buffer has a capacity of 8 words of 8 bytes each. Each storage location is provided with one of these 8 words with a random access to each storage location being possible, as well as the sequential reading of successive storage locations. At the output of buffer 2, the 8 bytes can be read in parallel so that the overall buffer capacity of 64 bytes can be covered in 8 storage cycles.

An error detection and correction code unit is provided between buffer 2 and processor 4 shown. When a word of 8 bytes is written into storage from the processor 4, check bits to this word are generated by device 3 in accordance with a predetermined code and stored in the storage together with the word. For example for each word of 8 bytes an additional check byte of 8 bits is generated. For each data byte a check bit can be stored so that the stored bytes now comprises 9 bits.

Upon the reading out of a data word from the storage into the processor the check bits for this word are once more generated by device 3, and compared with check bits which had been stored for the word. If necessary, an error correction signal is derived therefrom. Device 3 subsequently generates parity bits to the data words, and transfers them to the processor together with the data words.

Error correction code device 3 can process only full words of 8 data bytes, because the code required for generating the check bits is designed for a fixed number of data bits. Therefore when partial words are transferred these have to be formed into a full word. FIGS. 2a to 2c show a problem with the transfer of partial words. FIG. 2a shows the data contents of buffer 2 of 8 full words with 8 bytes each. FIG. 2b illustrates a partial data block of data to be transferred into the buffer 2.

The first word A and the last word O of this partial block are only partial words. That is they are not a full 8 bytes. FIG. 2c shows that when this partial data block is stored in the buffer the first word in the buffer would remain unchanged, the second word in the buffer would be partially overwritten, the next 5 words would be completely overwritten, and the eighth word would again be only partially overwritten.

From FIGS. 2a to 2c it can be concluded that there are no problems in the production of check bits for words 3 to 7. On the other hand, partial words 2 and 8 have to be supplemented with data from storage before passing through error correcting code device 3.

Figure 3:
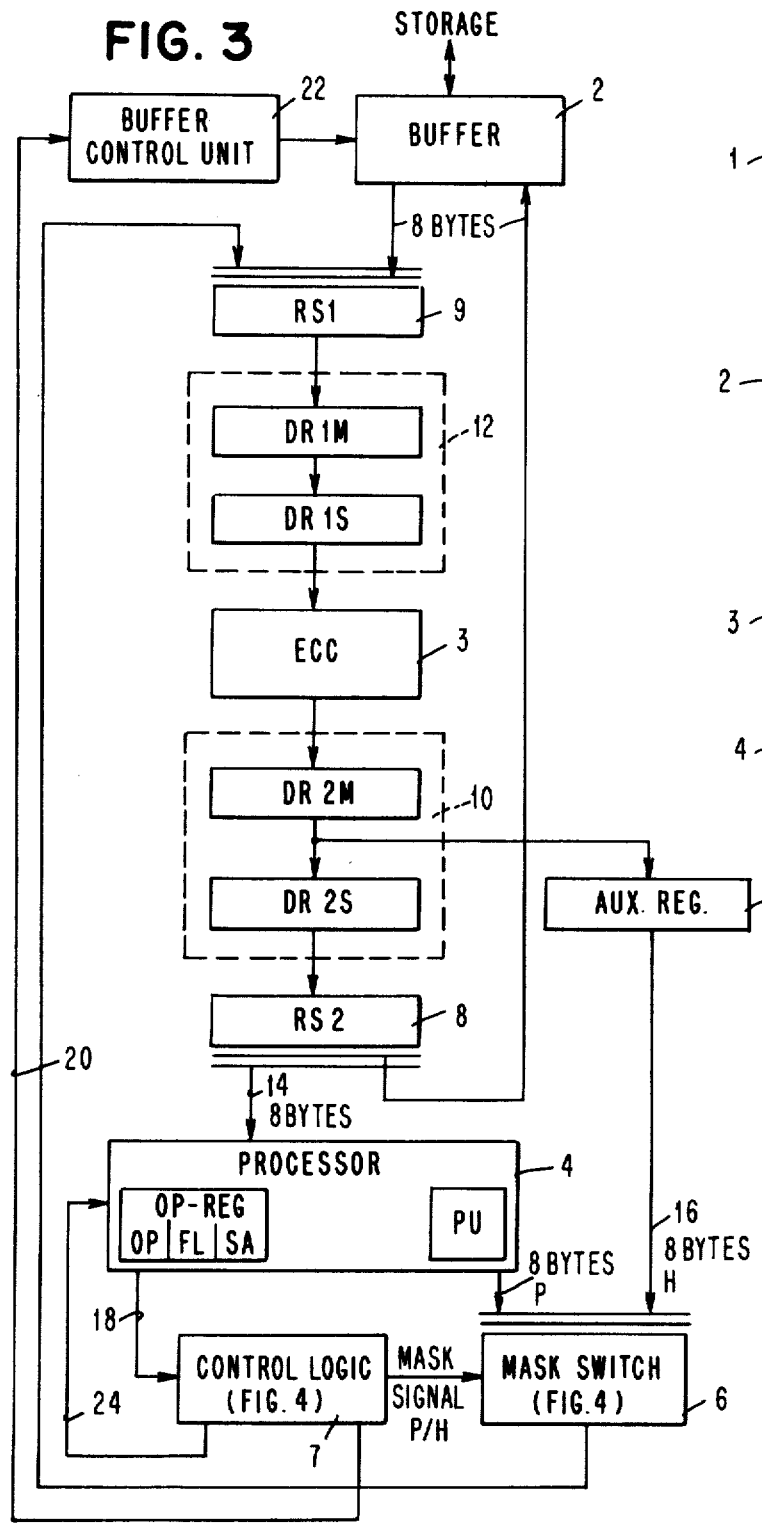

An embodiment of the invention for doing this in accordance with the present invention is shown in FIG. 3. In the transfer of data from buffer 2 into processor 4 the data passes along an 8 byte whole data path including direction switch RS 1, a first data register 12, error correcting code device 3, a second data register 10, and a second direction switch RS2. In the transfer of data from the processor 4 to the buffer 2, the buffer 2 is reached along with an 8 byte wide data path including a mask switch 6, direction switch 9, data register 12, device 3, data register 10, and direction switch 8.

According to the invention, the two words a and o with which partial words A and O from the processor are to be combined, are read out of buffer 2 prior to the transfer of the partial data block from the processor into storage 2 in a prefetch operation. Word a is read first and reaches data register 10 via direction switch 9, data register 12, and error correcting code device 3. This data register consists of a master part DR 2M and a slave part DR 2S. The data register 10 is divided in this manner. The word a is taken from the output of master part DR 2M, and stored in an auxiliary register 5. Then, the word o is read out of buffer 2 and reaches register DR 2M on the same described path and remains stored there for one cycle.

After these prefetch operations, which can take place overlappingly, the transfer of the partial data block from processor 4 into buffer 2 can be started. As the first word A is a partial word it has to be supplemented into a full word before passing through device 3. Mask switch 6 has been provided for this purpose. At its two inputs P and H the mask switch simultaneously receives partial word A and word a from auxiliary register 5. Control logic 7 supplies a mask signal to mask switch 6 with the consequence that byte 9 from auxiliary register 5 and bytes 10 to 16 from processor 4 can pass through mask switch 6 in their correct position. The thus formed full word can now be transferred via direction switch 9, data register 12 into error correcting code device 3 where it can easily be used by this device for generating check bits.

As soon as word a has been read from auxiliary register 5 into mask switch 6, word o is transferred from master part DR 2M into register 5 and remains there until its future use. It is pointed out in that connection that only error-free words are stored in register 5 since words a and o have already passed through the error correcting code device. With word o in register 5 the path of the data transfer for combined word a' (FIG. 2c) from error correcting code device 3 via data register 10, direction switch 8 into buffer 2 is free. Furthermore the path is free for transferring the following five words, i.e., bytes 17 to 56 from the processor via mask swith 6 and the above described data path into buffer 2.

After the transfer of word 7, the combination of word o and partial word o is performed in the same manner as partial word A was combined. That is, simultaneously with partial word O being supplied to mask switch 6, word o is read out of auxiliary register 5 and applied to mask switch 6 via line 16. For this purpose, control logic 7 supplied a mask signal for the passage of bytes 57 to 60 from the processor, and bytes 61 to 64 from auxiliary register 5.

The fact that the data bytes are transferred together with their parity bit the combination in switch 6 does not present any problems. Each byte whether it is from the processor or from auxiliary register 5 is transferred together with its associated parity bit. Switch 6 therefore permits the passage of each data byte together with its parity bit. Therefore the described device requires only one additional register, i.e., auxiliary register 5, to permit the transfer of a parital data block from processor 4 into storage 2 without practically any loss of time. Furthermore as shall be seen below, the prefetch operation can even be performed in a partly overlapping manner. To state it another way the effect of the present invention is such that the combination of the partial words of the partial data blocks with the respective buffer words practically takes place "on the fly". That is, the data transfer is not interrupted by the necessary combination operation. In addition, storing the two buffer words a and o requires only one single additional register which, according to a particularly advantageous embodiment, can be designed as a second slave register to master register DR 2M. As pointed out previously, the structure controlling the transfer of the partial data block is control logic 7. If an instruction is decoded in the operation register, processor 4 calls for a partial data block transfer and control logic 7 receives a control signal via line 18. At the same time, the address data required for the transfer, that is the start address SA and field length data FL, are transferred via line 18 to control logic 7. The control logic via line 20 then causes buffer control 22 to execute the above described prefetch operation and via line 24 therefore causes processor 4 to start the block transfer. The moment for the logic transfer can for example coincide with the transfer of word a from master part DR 2M into auxiliary register 5.

As shown in FIG. 4, control logic 7 contains an address arithmetic unit 32. This unit receives the data required for the address calculation from three sources; a field length register 26, a rgister for start address 28, and an address cunter 30. Units 26, 28 and 30 receive the data via line 18 from processor 4 when the operation register of the processor decodes an operation information OP that indicates a partial data block transfer (a transfer operation in which the byte start address is not at a word boundary). In such a case, field length data FL and start address SA are transferred from the operation register into register 26 and 28 respectively. Address arithmetic 32 then calculates the start address and field length of the last partial word of the partial data block. A prefetch cycle is subsequently released to buffer control unit 22 via line 20 and the two words a and o are transferred in the same manner described above from buffer 2 into auxiliary register 5, and into register DR 2M, respectively. Processor 4 is informed of the prefetch operation that has been executed via line 24 and the processor can then start the partial data block transfer by transferring the first partial word A to mask switch 6.

Word A has now to be combined with word a from auxiliary register 5. For this purpose mask switch 6 has to transfer byte 9 of word a and bytes 10 to 16 of word A to direction switch 9. To accomplish this, mask switch 6 has 8 byte-gates for bytes 1 to 8 of a word. Each byte gate receives inputs corresponds bytes both from the processor at input P and the byte from auxiliary register 5 at input H. The 8 byte inputs of the processor are marked in FIG. 4 with P1 to P8, and the 8 byte inputs of auxiliary register 5 are marked H1 to H8. Each byte gate receives from a mask control 34 in control logic 7 a control signal P/H, and, as a function of this control signal, permits the passage of either the byte from the processor or the byte from auxiliary register 5.

Mask switch 6 sets up a border determined by mask control 34. On the one side of the border only bytes from processor 4, and on the other side of the border only bytes from auxiliary register 5 are permitted to pass. Mask control 34 in turn is controlled by the information supplied to it on partial words A and 0. The transfer of words which are not to be combined (bytes 17 to 56 in FIG. 2b) is performed by means of the address counter and of timing control 30.

Figure 5:
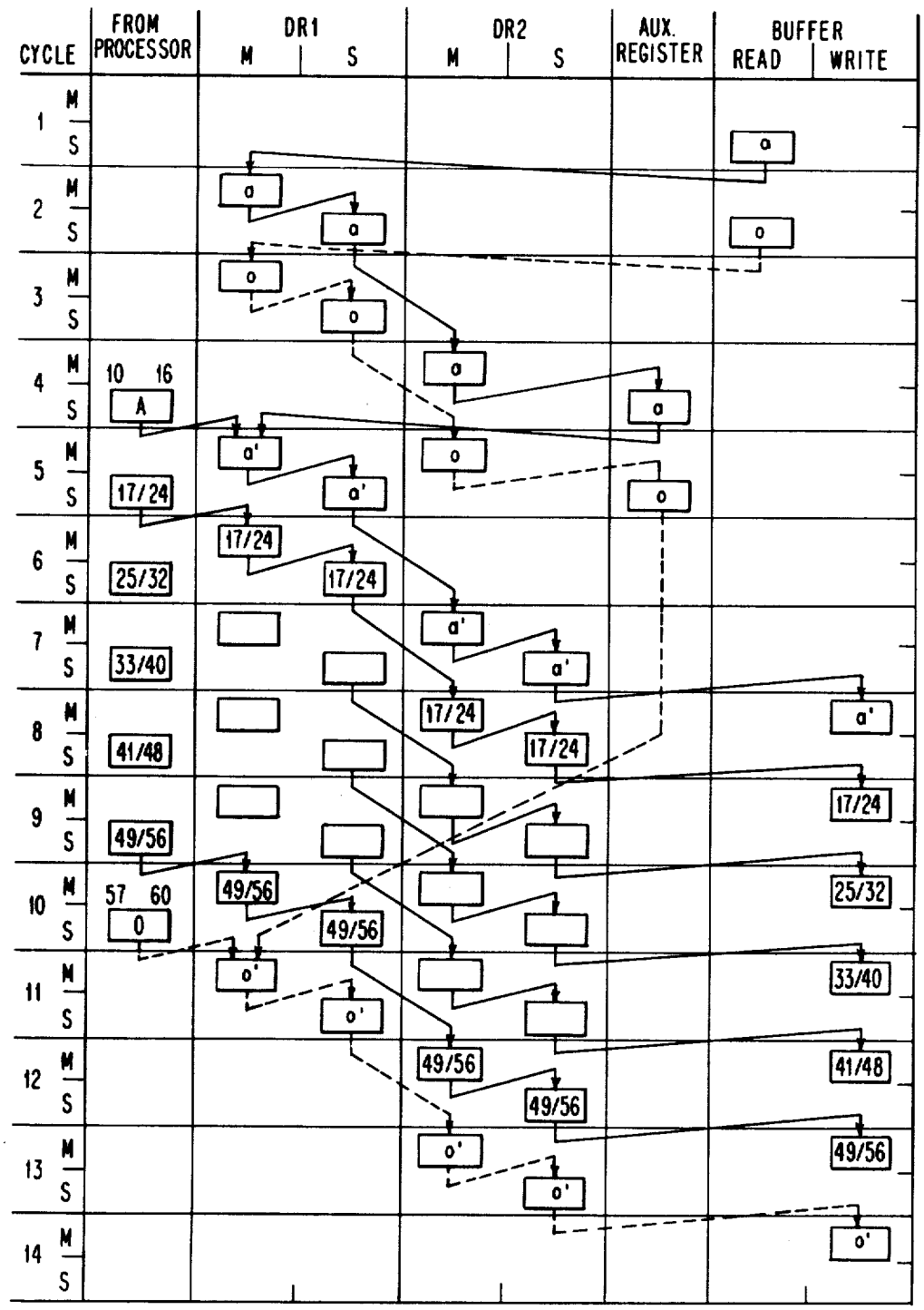

FIG. 5 is a time chart of the transfer of a partial data block in which the cycles are numbered 1 to 14. These cycles are each divided into two subcycles; a master part M and a slave part S. The subcycles are shown as being of equal length, however, it is also possible to provide more than for cycle M than for cycle S.

As shown in FIG. 5, word is a read out of the buffer in cycle 1 and brought into master part DR 1M of the first data register 12. Word a is transferred via the slave part of this data register into the master part DR 2M of the second data register 10. During that process, the word has to pass through the error correcting code device 3 which requires approximately 1.5 cycles. Simultaneously with the reading out of word a from DR 1S, word o can be read out of the buffer in register DR 1M. Consequently the prefetch operations of word a and o can be overlapped. In the fourth cycle word a from DR 2M is brought into auxiliary register 5. During the same cycle, the data transfer from the processor can be started by transferring the first word A. In the fifth cycle both words A and a are combined and in the master part of this cycle 5 reach register DR 1M. Simultaneously during the master part of cycle 5, word o can be read into register Dr 2M since this register has already been cleared in the preceding cycle. In the slave part of cycle 5, word o is read into auxiliary register 5 and remains there until it is combined at the end of the partial data block transfer, in cycle 11, with the last word O of the partial data block.

In the slave parts of cycles 5 to 9, the processor emits the five full words of the partial data block, and they reach buffer storage 2 via mask switch 6, direction switch 9, the first data register 12, error correcting code 3, the second data register 10, and direction switch 8. FIG. 5 shows that combined word a' is the first to be stored into the buffer storage in the master part of cycle 8. In the following five cycles, the five field words of the partial data block are read into buffer 2.

The last and partial word O of the partial data block is emitted by the processor in the slave part of cycle 10 and reaches the register DR 1M after having been combined with word o obtained from auxiliary register 5 during the master part of cycle 11. From there, this last word o' reaches buffer 2 via register Dr 1S, error detection and correcting code unit 3, the second data register 10, and direction switch 8. Subsequently it is stored in the buffer in the master part of cycle 14.

FIG. 5 once more shows quite clearly that during data transfer there is no delay owing to the fact that the first and the last word of the data block to be transferred are partial words. The transfer from the processor starts in cycle 4 and ends in cycle 10, i.e., it takes 7 cycles. The same number of cycles as is required for the storing in buffer 2, i.e., from cycle 8 to cycle 14. The delay of 4 cycles is due to overlapping and is not caused by partial storage problems.

In FIGS. 3 and 5, the two data registers 10 and 12 are represented as being constructed of a master part and of a slave part. This structure, however, is not absolutely necessary for executing the invention. With respect to the data register 12, it is quite obvious that this register could also consist of one single register storage. If data register 10 is also simplified in this manner the input of auxiliary register 5 would have to be conneted between the output of data register 10 and the input of direction switch 8. However in the embodiment described in connection with FIGS. 3 and 5, auxiliary register 5 is provided by adding an additional slave part to data register 10.

Having thus described our invention, what we claim as new, and desire to secure by Letters Patent is:

1. In the transferring of a partial data block along a data path from a processor to a memory which is protected by the error correcting code unit which is located in the data path and which requires that full data words of a fixed number of bytes be stored in the memory along with error correction check bits generated by the error correcting code unit, the improvement which comprises:
   control means for determining if either or both the first and last word of said partial data block are partial words having less than said fixed number of bytes and for generating mark bits identifying bytes missing from said partial words,
   prefetch means responsive to the determination of said control means for fetching any stored word said memory that corresponds to any one of said partial words and passing said stored data word thru said error correcting code unit in said data path prior to the beginning of said transferring of the partial data block along said data path to said memory;
   register means coupled to said data path for temporarily storing any stored data word fetched by the prefetched means and passed through said error correctoing code unit; and
   mask means coupled to said processor, and said register and responsive to said mark bits for combining any said partial word from said processor with its corresponding stored word in said register means to replace bytes missing in said partial word and thereby generate a full data word with said fixed number of bytes for transferring along said data path to said memory through said error correcting code unit.

2. The structure of claim 1 wherein:
   said mask means is coupled between a data output of said processor and an input of said path and,
   one output of said path is coupled to the memory and a second output of the path is connected to the processor.

3. The structure of claim 2 whereby said register means includes two registers in series, the first register is coupled in the path between the error correcting code unit and both the mentioned outputs of the path and, the second register is connected outside the path between the output of the first register and the input to the mask means.

4. The structure of claim 3 wherein said control means receives data block starting byte and data block length information from the processor and generates masks bits to control the mask means to select data bytes from second register or the processor.

* * * * *